Figure 1:
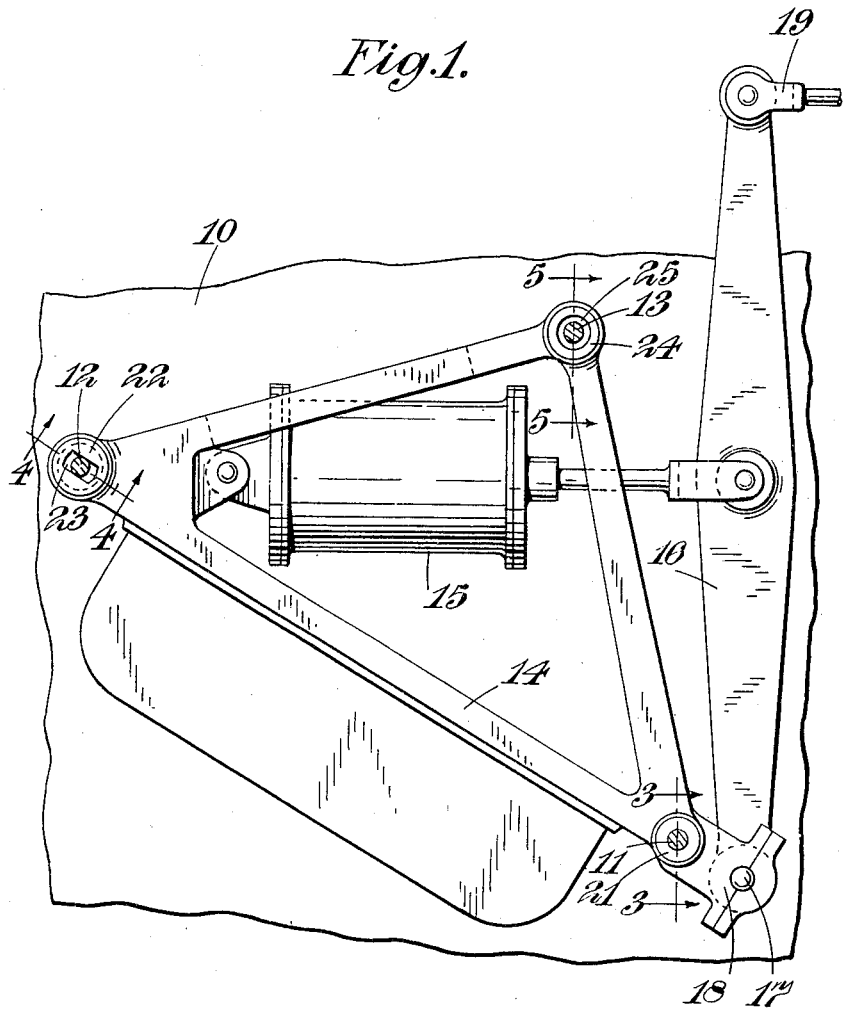

July 13, 1943.  F. W. MEREDITH  2,324,224
LOCATING AND FASTENING MEANS
Filed May 31, 1941  2 Sheets-Sheet 1

July 13, 1943.  F. W. MEREDITH  2,324,224
LOCATING AND FASTENING MEANS
Filed May 31, 1941  2 Sheets-Sheet 2
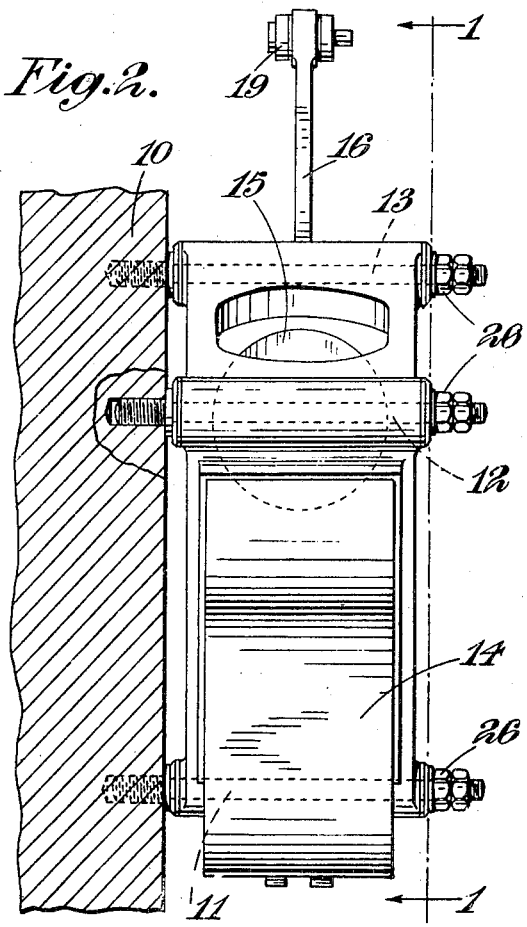
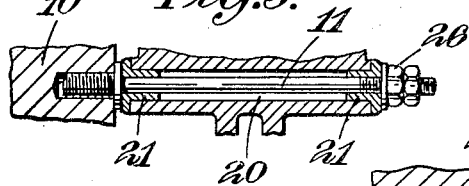
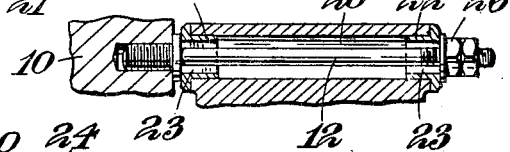

Patented July 13, 1943

2,324,224

UNITED STATES PATENT OFFICE 2,324,224

LOCATING AND FASTENING MEANS

Frederick William Meredith, Cricklewood, London, England, assignor to S. Smith & Sons (Motor Accessories) Limited, Cricklewood, London, England, a British company Application May 31, 1941, Serial No. 396,130
In Great Britain May 16, 1940

3 Claims. (Cl. 248—14)

For locating and fastening interchangeable members it is usual to employ fixing bolts or studs and/or locating pins on one member and correspondingly positioned holes in another member to receive the bolts, studs or pins. For properly positioning the members with respect to one another some of the bolts or the like must be accurately positioned and also an accurate fit in the holes receiving them, and where one member is to be replaceable by another similar member the necessary accuracy is difficult to obtain in mass production. The object of the invention is to avoid this disadvantage.

According to the invention means for locating and fastening interchangeable members comprises a locating bolt or the like on one member engaging in a properly positioned and accurately fitting hole in the other member and preventing all relative movement except rotation about the axis of this bolt, a second locating bolt or the like on one of the members, spaced laterally from the other locating bolt and engaging in a hole in the other member and accurately fitting this hole transversely of a line joining this hole with the first bolt or hole but with clearance along this line and means clamping the members together with the locating bolts in position in the respective holes.

It is convenient for the locating bolts or the like also to serve as means for clamping the members together, and they may be supplemented by one or more additional fixing bolts or studs which are loose fits in the holes receiving them so as to require no accuracy as regards the position and size of the bolt and bolt holes.

One application of the invention is to the mounting of automatically controlled servo-motor units in aircraft or watercraft. Such units are of intricate construction and if a unit fails it is convenient to replace it by another similar unit rather than to attempt to repair the unit while fitted in the craft. It is necessary, however, that the replacement unit should be accurately located with respect to the craft if it is to be coupled up without adjustment to the existing connections. The invention therefore further comprises, in an aircraft or watercraft, locating and fastening means as aforesaid for the attachment of an interchangeable servo-motor unit to another member consisting of a mounting for the servo-motor unit in the craft.

One specific application of the invention to the mounting of a servo-motor unit is shown by way of example in the accompanying drawings, in which:

Figure 1 is a plan, partly in section, of the servo-motor unit and its mounting, the section being taken on line 1—1 of Figure 2, Figure 2 is a side elevation of the servo-motor unit and mounting shown in Figure 1, Figure 3 is a section on line 3—3 of Figure 1, Figure 4 is a section on line 4—4 of Figure 1, and Figure 5 is a section on line 5—5 of Figure 1.

Referring to the drawings, a base member 10 fixed in the craft to receive the servo-motor unit is provided with three upstanding studs 11, 12 and 13 spaced apart. These studs are preferably so arranged as to occupy the corners of approximately an equilateral triangle. The servo-motor unit comprises a triangular frame 14 carrying a servo-motor 15 which is connected to a lever 16. This lever is carried at one end by a pivot 17 mounted in an extension 18 of the frame 14. The other end of the lever 16 has a connection 19 for the part to be operated by the servo-motor.

The frame 14 has holes 20 to receive the studs 11, 12 and 13. In the hole to receive the stud 11 there are non-rotatable liners 21 accurately fitting the stud 11. In the hole 20 receiving the stud 12 there are non-rotatable liners 22 each formed with a slot 23 extending in the direction of the hole 20 which receives the stud 11 and having a width equal to the diameter of the stud 12. The third hole 20 for receiving the stud 13 has non-rotatable liners 24 with central holes 25 of such size as to provide adequate clearance around the stud 13. The studs 11, 12 and 13 are screw-threaded at their outer ends to constitute bolts receiving nuts 26 to clamp the frame 14 on to the base 10.

The stud 11 accurately fitting the liners in the frame properly locates the frame on the base at a position close to the pivotal mounting of the lever 16 on the frame. The stud 12 prevents rotation of the frame 14 about the stud 11 but the slots in the liners in which the stud 12 engages allow for a wide tolerance in the relative positions of the studs 11 and 12 and the relative positions of the holes 20 in the frame for receiving these studs. The positions of the stud 13 and the hole 20 which it engages need not be accurate owing to the wide all-round clearance. The stud 13 serves only as a means for clamping the frame 14 to the base and the other studs 11 and 12 also serve for clamping purposes in addition to locating the frame 14 in position.

It will be seen therefore that the only accuracy required in the forming of the holes in the frame is in regard to the size and position of the hole to receive the stud 11 and the width and direction of the slots receiving the stud 12. As the frame 14 is accurately located by the stud 11, which is close to the pivot of the operating lever 16, and is accurately positioned rotationally with respect to this stud by the stud 12, the servo-motor unit can be replaced by another similar unit without any necessity for adjustment of the connection 19 with other mechanism in the craft.

I claim:

1. In an aircraft or watercraft the combination with a mounting for a servomotor unit and an interchangeable servomotor unit carried by said mounting, of a locating bolt projecting from said mounting and engaging in a properly positioned and accurately fitting hole in said servomotor unit and preventing movement of the servomotor unit on the mounting except rotation about said bolt, a second locating bolt projecting from the mounting spaced laterally from the first said locating bolt and engaging in a slot in said servomotor unit, said slot extending in line with said hole so as to provide clearance for said second locating bolt along said line and said slot having a width accurately fitting said second locating bolt so as to prevent rotation of said servomotor unit about the first said locating bolt, a third bolt projecting from said mounting and spaced from the other locating bolts and engaging in a hole in the servomotor unit with appreciable clearance, and means comprising said bolts for clamping the servomotor unit on the mounting.

2. Locating and fastening means for interchangeable members comprising a locating part on one member engaged in a properly positioned and accurately fitting hole in the other member and preventing all relative movement of said members except rotation about the axis of said part, a second locating part on one of said members spaced laterally from the first said locating part and engaging in a hole in the other member and accurately fitting this hole transversely of a line joining said holes, but having clearance along the said line, a third part on one of said members arranged to extend loosely through a hole in the other member, which members are provided with abutting faces in the region of each of said parts so as to provide a three-point support and means clamping the abutting faces together with said locating parts in position in the respective holes.

3. In an aircraft or watercraft the combination with interchangeable members consisting of a mounting for a servomotor unit and an interchangeable servomotor unit carried by said mounting, of a locating bolt in one member engaging in a properly positioned and accurately fitting hole in the other member and preventing all relative movement of said members except rotation about the axis of said locating bolt, a second locating bolt in one of said members spaced laterally from the first said locating bolt and engaging in a hole in the other member and accurately fitting this hole transversely of a line joining said holes but having clearance along said line, a third bolt on one of said members, arranged to extend loosely through a hole in the other member, which members are provided with abutting faces adjacent said bolts so as to provide a three-point support and means comprising said bolts for clamping said members together across said abutting faces.

FREDERICK WILLIAM MEREDITH.